United States Patent [19]

Glennon

[11] Patent Number: 4,622,629
[45] Date of Patent: Nov. 11, 1986

[54] POWER SUPPLY SYSTEM WITH IMPROVED TRANSIENT RESPONSE

[75] Inventor: Timothy F. Glennon, Rockford, Ill.

[73] Assignee: Sundstrand Corporation, Rockford, Ill.

[21] Appl. No.: 660,150

[22] Filed: Oct. 12, 1984

[51] Int. Cl.[4] ............................................... H02J 1/10
[52] U.S. Cl. ...................................... 363/70; 363/46; 363/89; 363/126
[58] Field of Search ................... 322/28, 58; 323/274; 361/111; 363/46, 67, 69, 70, 89, 125, 126, 52, 53, 101; 307/44

[56] References Cited

U.S. PATENT DOCUMENTS

| | | | |
|---|---|---|---|
| 3,229,184 | 1/1966 | Churchill | 363/69 |
| 3,470,444 | 9/1969 | Bixby | 363/86 |
| 3,636,433 | 1/1972 | Hyatt | 363/89 |
| 3,652,919 | 3/1972 | Harrigan | 363/89 |
| 3,886,438 | 5/1975 | Bouman | 307/44 |
| 3,986,100 | 10/1976 | Beierholm et al. | 323/17 |
| 4,009,431 | 2/1977 | Johnson | 363/69 |
| 4,183,082 | 1/1980 | Ishii | 363/89 |
| 4,208,709 | 6/1980 | Garnham et al. | 363/69 |
| 4,212,054 | 7/1980 | Seki | 363/126 |
| 4,336,486 | 6/1982 | Gorden et al. | 322/63 |
| 4,471,855 | 9/1984 | Nomura | 363/69 |
| 4,555,753 | 11/1985 | Takahashi | 363/70 |

FOREIGN PATENT DOCUMENTS 0811230  3/1981  U.S.S.R. ............................ 363/69

Primary Examiner—Patrick R. Salce
Assistant Examiner—Jeffrey Sterrett
Attorney, Agent, or Firm—Wood, Dalton, Phillips, Mason & Rowe

[57] ABSTRACT

An apparatus for improving the transient response of a power supply system having an alternator for developing AC power and a rectifier for converting the alternator output into primary DC power includes a second rectifier for rectifying the alternating current power from the alternator to derive supplemental DC power and means responsive to a parameter of the primary DC power for coupling the supplemental DC power to the primary DC power when the parameter drops to a particular value so as to minimize the effect of load changes on the system. The purpose of the disclosed system is to allow the alternator to be sized for minimum electromagnetic weight while at the same time providing a simple means of reducing load application transients.

12 Claims, 8 Drawing Figures

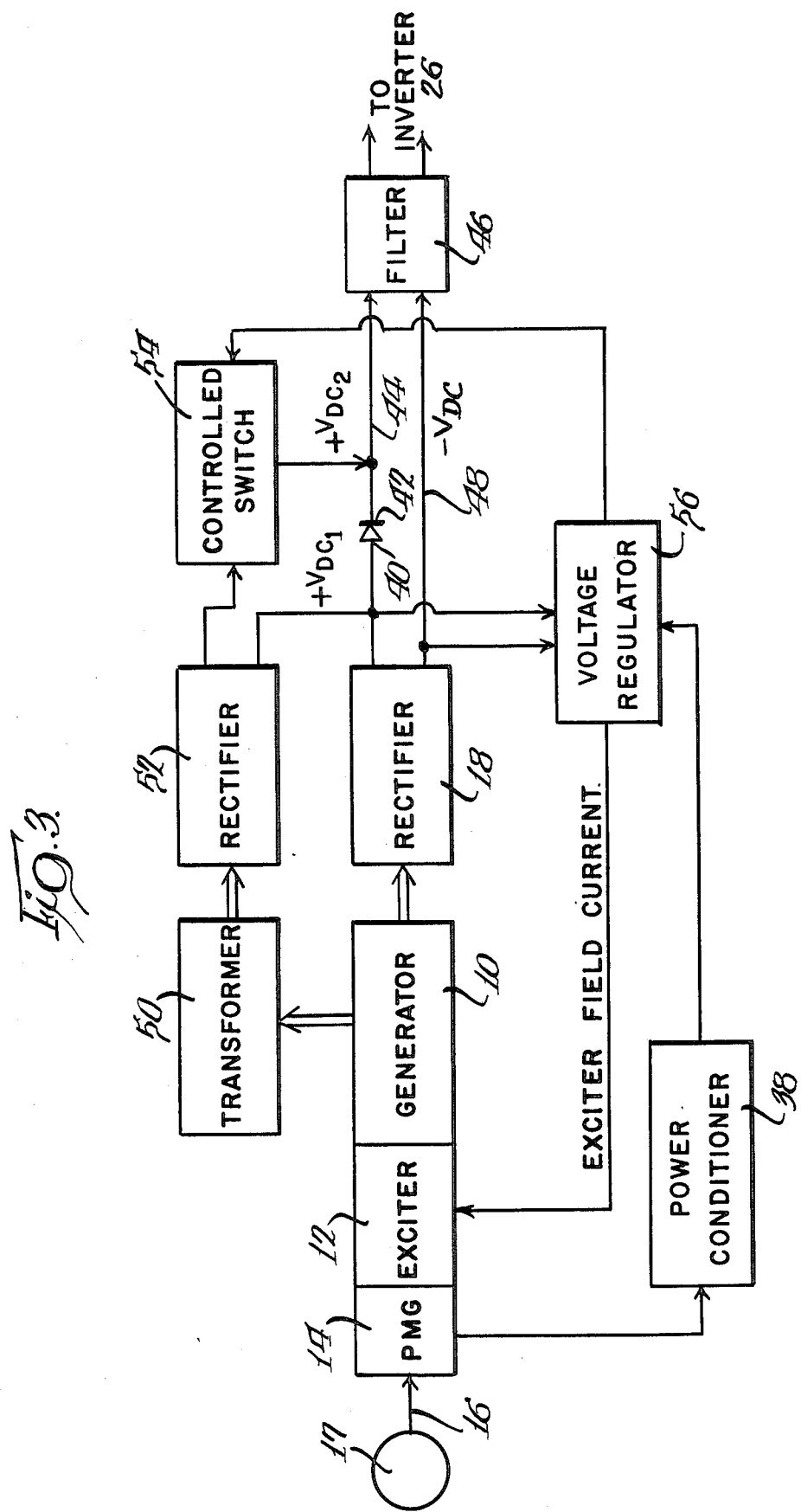

POWER SUPPLY SYSTEM WITH IMPROVED TRANSIENT RESPONSE

DESCRIPTION

1. Technical Field

The present invention relates generally to power supply systems, and more particularly to an alternator having an output which is rectified to produce DC power.

2. Background Art

Prior types of power supply systems driven by variable speed prime movers include an alternator which generates alternating current power having a frequency dependent upon the speed of the prime mover, a rectifier bridge for rectifying the output of the alternator to develop DC power and an inverter which is controlled to develop constant frequency AC power for energizing a load.

It has been previously found that the ability of a generating system to quickly respond to step changes in load is dependent upon the electromagnetic size of the alternator. In applications requiring a stable source of power output, the electromagnetic size of the alternator must be quite large in order for the system to have adequate step response.

The required increase in alternator size and weight can be particularly disadvantageous in applications requiring a compact and light generating system driven by a source of motive power operating over a wide speed range.

DISCLOSURE OF INVENTION

In accordance with the present invention, a power supply system including an alternator and a first rectifier for converting the alternator output into DC power includes means for improving the transient response of the system so that the alternator size and weight can be reduced as compared with prior systems for a given step load handling capability.

The means for improving the transient response includes means coupled to the alternator output for deriving alternating current power therefrom, a second rectifier connected to the deriving means for converting the alternating current power into supplemental DC power and means responsive to a parameter of the DC power from the first rectifier for coupling the supplemental DC power thereto when the parameter drops to a particular value to minimize the effect of load transients on the power supply system.

In the preferred embodiment, the deriving means comprises a transformer having a set of primary windings connected to the alternator output and a set of secondary windings connected to the second rectifier. The coupling means in the preferred embodiment comprises a transistor connected to the output of the second rectifier which is operated by a transistor control. The transistor control is in turn responsive to a voltage regulator which senses the DC voltage at the output of the first rectifier and which additionally controls the current delivered to an exciter which supplies field current to the alternator.

When the DC voltage from the first rectifier drops to the particular value, the voltage regulator causes the transistor control to connect the output from the second rectifier across a diode connected in a DC bus carrying the DC voltage from the output of the first rectifier.

The resulting DC output voltage comprising the combined outputs from the first and second rectifiers is maintained above a preselected value even when full rated load is applied in a step fashion. The resulting improvement in transient response permits the alternator to be sized for minimum electromagnetic weight.

BRIEF DESCRIPTION OF THE DRAWINGS

FIG. 3 is a block diagram of a power supply system according to the present invention which incorporates means for improving the transient response of the system;

BEST MODE FOR CARRYING OUT THE INVENTION

Figure 1:
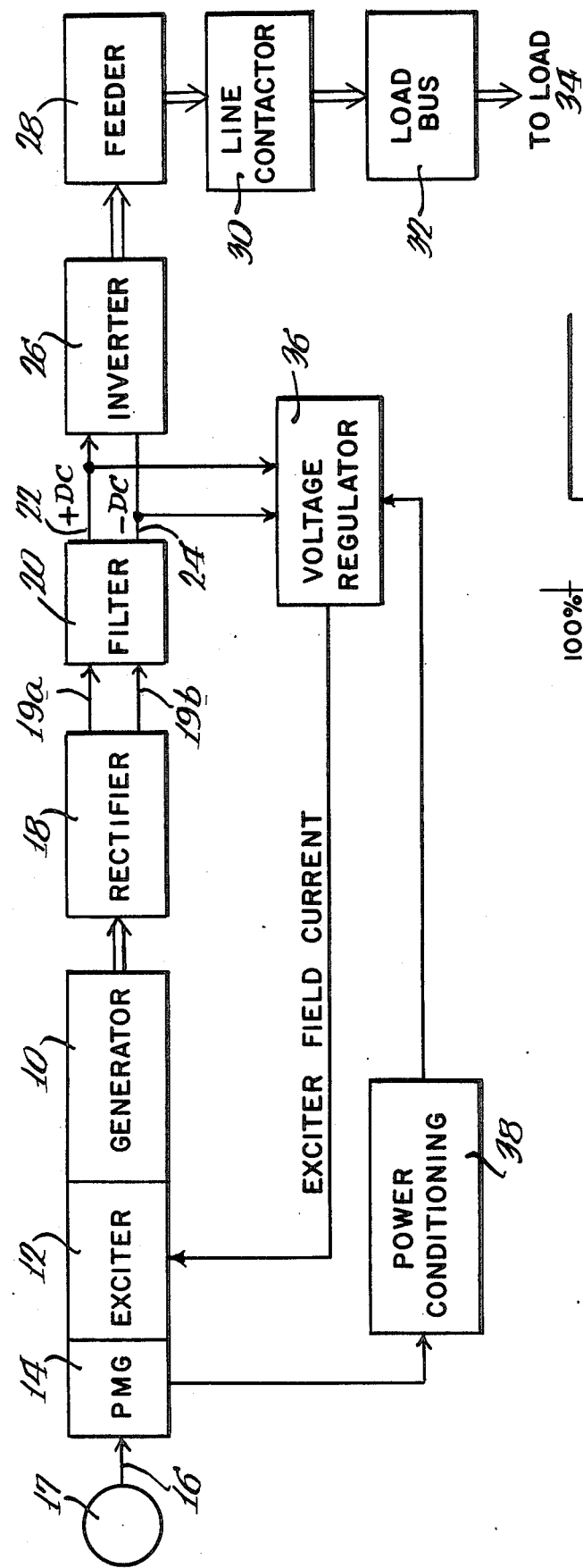
FIG. 1 is a block diagram of a prior art power supply system for developing constant frequency output power from a variable speed prime mover.

Referring now to FIG. 1, there is illustrated a prior art power supply system which generates constant frequency output power from a variable speed source of motive power. The generating system includes a conventional generator or alternator 10 which may be a wound field machine receiving field current from an exciter 12. Power for the exciter is derived from a permanent magnet generator, or PMG 14, which additionally supplies auxiliary power to other components of the system, as noted more specifically below. The generator 10, exciter 12 and PMG 14 each include rotor structures which are driven by a common shaft, indicated schematically at 16, which is driven by a prime mover 17.

The generator 10 may develop either single or polyphase alternating current power having a frequency which varies in proportion to the speed of the shaft 16. This variable frequency power is rectified by a rectifier circuit 18 comprising a plurality of diodes connected in a bridge configuration and the output therefrom over a pair of lines 19a,19b is delivered to a filter 20 which produces substantially constant DC voltage on a pair of DC link buses 22,24.

The DC voltage on the buses 22,24 is then converted back to constant frequency AC voltage by an inverter 26. The constant frequency voltage is connected by a feeder 28, a line contacter 30 and a load bus 32 to one or more loads 34.

A voltage regulator circuit 36 senses the DC voltage across the DC link buses 22,24 and controls the exciter field current in accordance with the sensed voltage.

Power for the components in the voltage regulator 36 is derived from a power conditioning circuit 38 which in turn receives the auxiliary power from the PMG 14.

It should be understood that various controls not pertinent to an understanding of this system, such as the control for the three phase inverter 26, are not shown for purposes of clarity.

Figure 2:
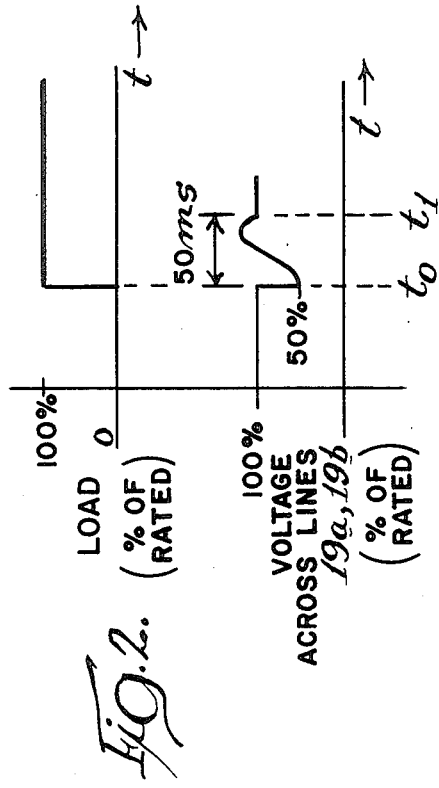
FIG. 2 is a pair of graphs illustrating the response of the system shown in FIG. 1 following the application of a step load thereto.

Referring now to FIG. 2, the transient response of the system shown in FIG. 1 is illustrated under the assumption that at a time $t=t_0$, a load equal to 100% of the rated load that can be handled by the system is applied in a step fashion. In the particular system shown in FIG. 1, the step application of a 100% load reduces the voltage on the lines 19a,19b to 50% of its rated value immediately after $t_0$. The DC link voltage across the buses 22,24 also drops in an approximately linear fashion after $t_0$ to 50% of its rated value. These voltages then recover from this initial decrease until the link voltage is restored to its rated value. The time before which complete recovery occurs is typically on the order of 50 milliseconds, which is an undesirably long time for recovery in applications requiring a stable source of electrical power.

Referring now to FIG. 3, there is illustrated in block diagram form a power supply system which incorporates apparatus for improving the transient response or step handling capability of the system.

The system shown in FIG. 3 includes the alternator 10, exciter 12 and PMG 14 all coupled by a shaft 16 to the variable speed source of motive power 17. The output power of the wound field generator 10 is converted into primary DC power by the rectifier 18, as before noted. One polarity of the DC power from the rectifier 18 is connected through a first power bus 40, a diode 42 and second power bus 44 to a filter 46. The other polarity of the DC voltage from the rectifier bridge 18 is connected by a third power bus 48 directly to the filter 46.

The filter may be directly connected to a DC load or may alternatively be connected to the inverter 26, feeder 28, line contacter 30 and load bus 32 to energize an AC load 34, as previously noted in connection with FIG. 1.

The apparatus for improving the transient response of the power supply includes means for deriving alternating current power from the generator output, such means being preferably in the form of a transformer 50. The output from the transformer 50 is converted into supplemental DC power by a second rectifier circuit 52 which may comprise a plurality of diodes connected in a bridge configuration. The supplemental DC power from the bridge 52 is coupled to the primary DC power on the second power bus 44 by means of a controlled switch 54 when a parameter of the primary power, such as the voltage appearing across the first power bus 40 and the third power bus 48, drops to a particular value. This voltage is sensed by a voltage regulator 56 which controls the operation of the controlled switch 54, as noted more specifically below.

Figure 4:
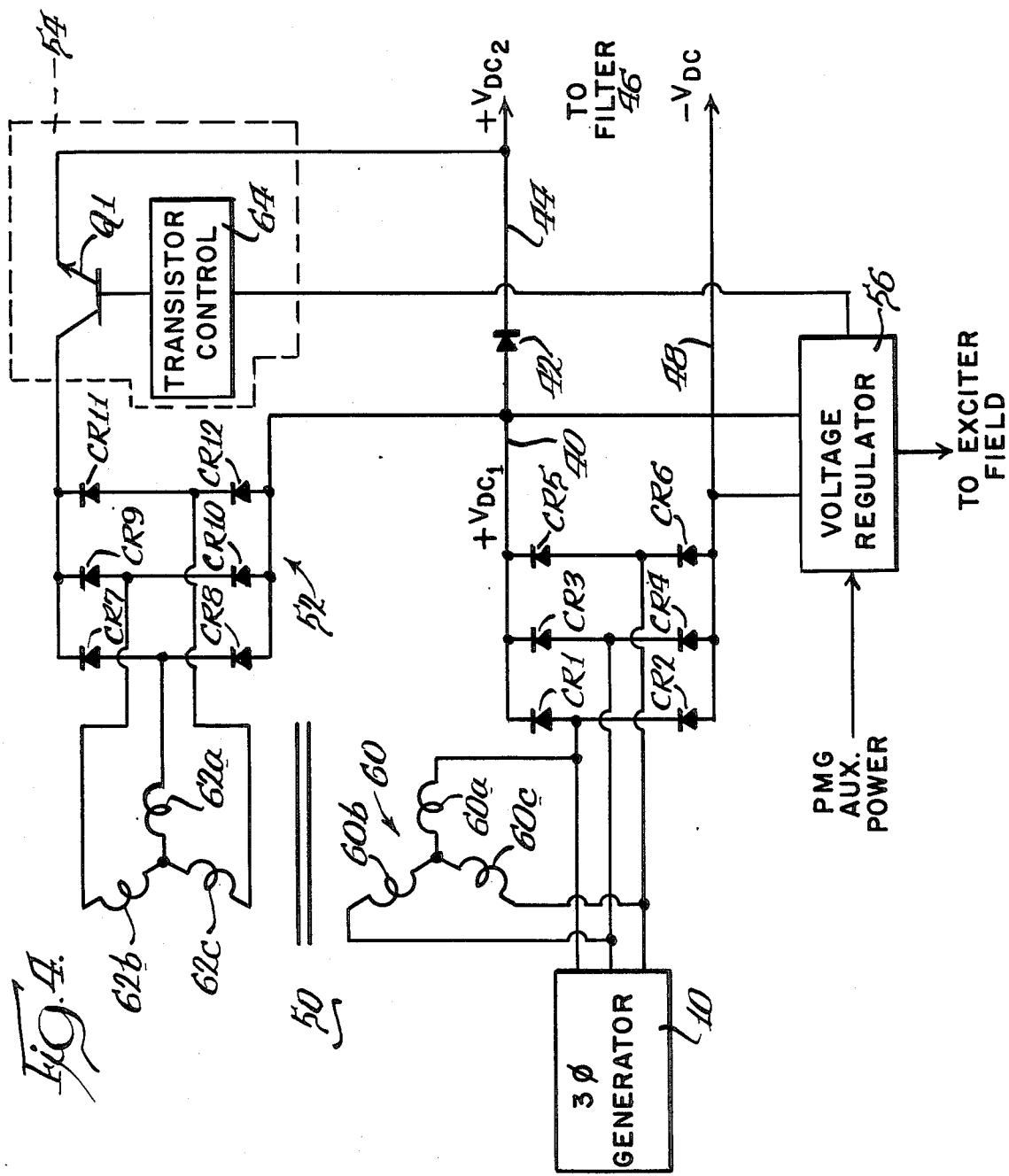
FIG. 4 is a schematic diagram of circuitry comprising a portion of the system shown in block diagram form in FIG. 3.

Referring now to FIG. 4, the transformer 50 includes a set of primary windings 60 and a set of secondary windings 62. The number of windings in the sets depends upon the number of phases of the generator and is shown for the case wherein the generator develops three phase output power.

Each of the first and second rectifier bridges 18,52 includes six diodes CR1-CR6 and CR7-CR12, respectively.

The controlled switch 54 includes a transistor Q1 and a transistor control circuit 64 which in turn is controlled by the voltage regulator 56.

Figure 5:
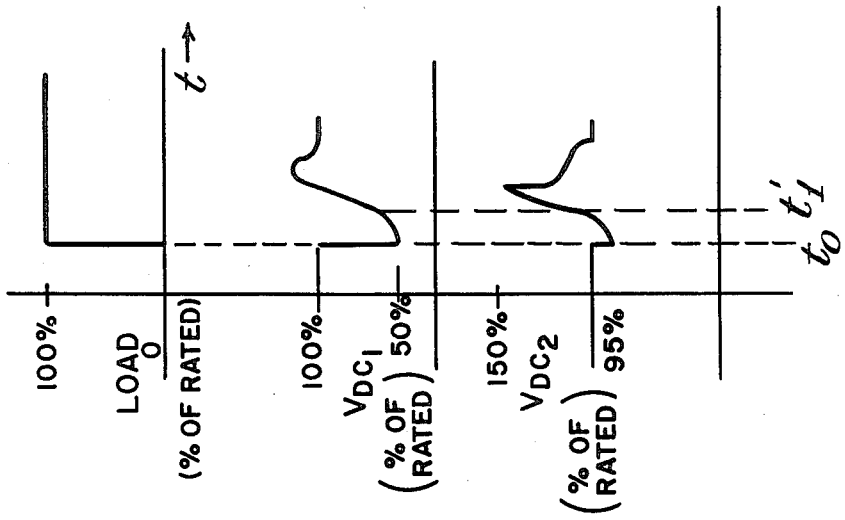
FIG. 5 is a series of graphs illustrating the operation of the circuitry shown in FIGS. 3 and 4.
Figure 6:
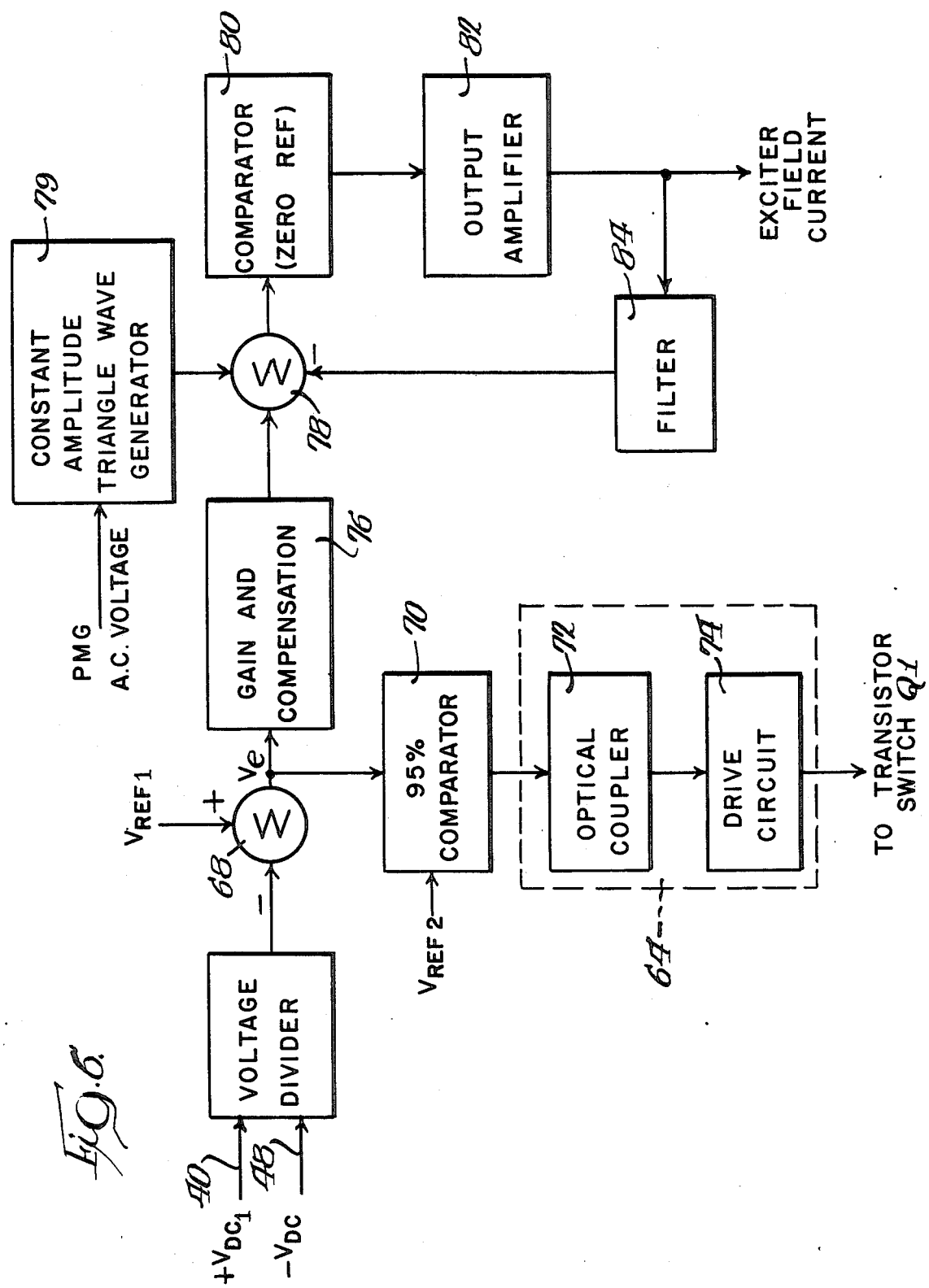
FIG. 6 is a block diagram of the voltage regulator and transistor control shown in FIG. 4.

Referring now to the graphs of FIG. 5 and the block diagram of FIG. 6, the voltage regulator 56 causes the transistor control 64 to turn on the transistor Q1 when the voltage across the power buses 40,48 drops to a particular value, such as 95% of rated voltage.

As seen specifically in FIG. 6, the lines 40,48 are connected to a voltage divider 66 for developing a stepped-down voltage which is compared against a reference voltage $V_{REF1}$ representing the rated voltage across the buses 40,48 in a summing junction 68 to derive an error voltage $V_e$. The error voltage $V_e$ is used not only to operate the transistor switch Q1 but also to control the exciter field current and hence the output voltage developed by the generator 10.

The error voltage is applied to a comparator 70 which compares the voltage against a second voltage $V_{REF2}$ representing 95% of the rated voltage across the power buses 40,48. When $V_e$ is less than $V_{REF2}$, a high state or switch control signal is delivered to an optical coupler 72 and a drive circuit 74 for operating the transistor switch Q1.

Alternatively, when $V_e$ is greater than $V_{REF2}$, no signal is generated by the comparator 70 and hence the transistor switch Q1 remains in an inoperative state.

As seen in FIG. 5, the operation of the switch Q1 to connect supplementary DC power to the DC voltage across the buses 40,48, causes the DC voltage across the buses 44,48, and the voltage at the output of the filter 46, to remain above a particular value, such as 95% of rated voltage. Complete recovery to 100% of rated voltage across the buses 44,48 is accomplished at time=$t_1'$, at which time the voltage across the buses 40,48 has not yet risen appreciably above 50% of rated.

The voltage spike appearing across the buses 44,48 subsequent to time $t_1'$, can be clipped in the filter 46 or can be controlled by controlling the inverter 26 utilizing pulse-width modulation techniques, as noted more specifically below.

The remainder of the voltage regulator shown in FIG. 6 is common to prior art systems and includes a gain and compensation circuit 76, a summing junction 78 which adds the output of the gain and compensation circuit 76 with a constant amplitude triangle wave and a comparator 80 for comparing the resulting triangle wave impressed on a DC level with a particular reference value. The comparator output is a pulse-width modulated, or PWM, wave which is amplified by an output amplifier 82 and applied to the exciter field winding. Current feedback is accomplished by means of a filter 84 which is connected back to the summing junction 78 in a negative sense.

The voltage control afforded by the system of the present invention allows the alternator to be sized for minimum electromagnetic weight.

Figure 7:
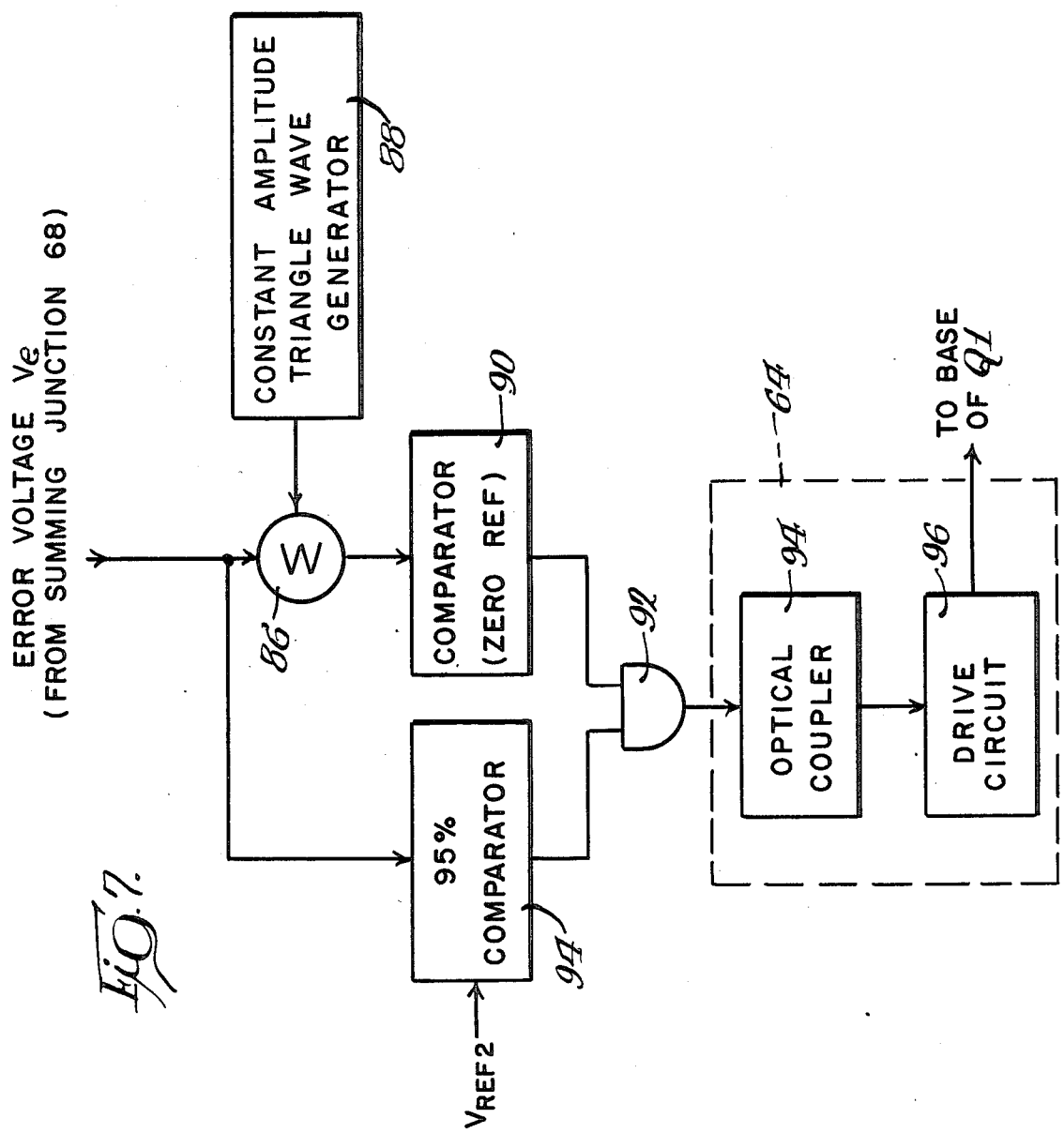
FIG. 7 is a block diagram of an alternative embodiment of the voltage regulator shown in FIG. 4.

Referring now to FIG. 7, there is illustrated in block diagram form a circuit for controlling the voltage spike appearing across the conductors 44,48 subsequent to time $t_1'$. In general, this is accomplished by pulse-width modulating the switching of the transistor Q1 to in turn control the supplementary DC power coupled across the diode 42 shown in FIG. 4.

The error voltage $V_e$ from summing junction 68 is coupled to a summing junction 86 which receives as a second input a triangle wave from a generator 88. The triangle wave from the generator 88 may have a frequency different than the frequency of the triangle wave from the generator 79 shown in FIG. 6. The output from the summing junction 86 is connected to a comparator 90 which compares the summing junction signal with a reference. The output from the comparator is a pulse-width modulated, or PWM wave which is connected to one input of an AND gate 92.

A second input of the AND gate 92 is connected to the output of a comparator 94 which compares the error voltage $V_e$ with the reference voltage $V_{REF2}$. The AND gate 92 comprises means for combining the PWM wave with the output of the comparator 94. The AND gate 92 develops a pulse-width modulated wave when the voltage across the buses 40,48 is less than 95% of rated voltage, with the pulse widths being dependent upon the level of the error voltage $V_e$.

The output from the AND gate 92 is connected through an optical coupler 94 and a drive circuit 96 to the base of the transistor Q1 to control same.

Other techniques for clipping or otherwise limiting the voltage excursion subsequent to time $t_1'$, such as passive or active means in the filter 46, can alternatively be utilized, if desired.

It should be noted that the transformer 50 may be dispensed with if desired, providing that a suitable means of deriving power from the generator is substituted therefor, such as extra windings disposed within the generator stator.

Figure 8:
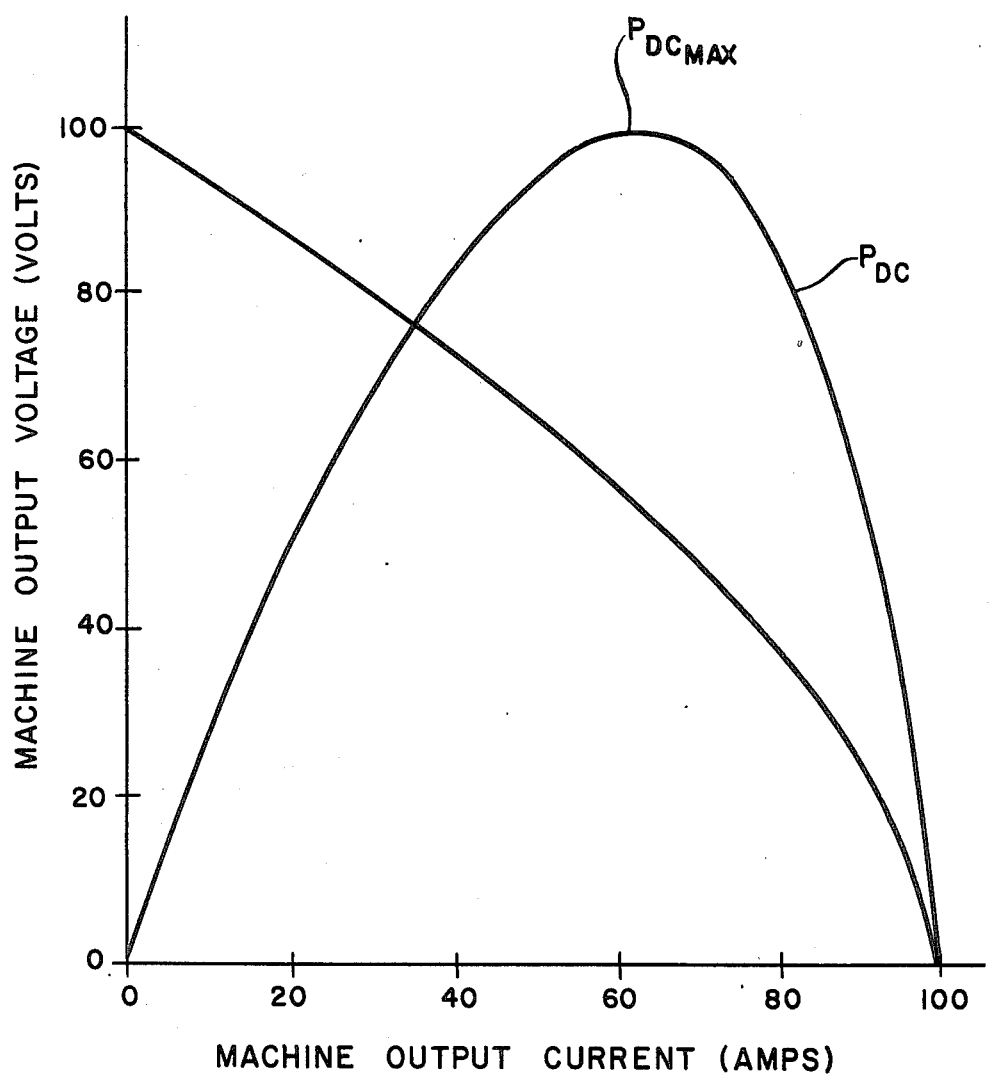
FIG. 8 is a graph illustrating the voltage/current characteristic and power curve for an alternator such as that shown in FIG. 3.

Referring now to FIG. 8, there is illustrated a pair of curves representing the voltage/current characteristic and the power developed by a particular generator driven at a constant speed and supplied with a particular level of field current. The curves of FIG. 8 will be utilized to illustrate the progression of events as a step load is applied to the output of the generator. In this example, the no load output voltage of the alternator is 100 volts while the full load current is 100 amps.

In general, the alternator must be operated in a region less than the maximum power point, designated $P_{DCMAX}$, i.e. to the left of the maximum power point shown in FIG. 8. In other words, the current drawn by a load should not exceed approximately 62 amps for the example shown in FIG. 8.

Furthermore, the turns ratio of the transformer 50 is selected so that the voltage coupled across the diode 42 shown in FIG. 4 adds to the voltage at the output of the first rectifier bridge 18 to cause the voltage to be maintained at a desired level. In the instant example, the desired output voltage is 100 volts. The turns ratio is determined empirically as noted below.

Assume, for example, that a 5 ohm load is connected in a stepwise fashion at a time $t = t_0$ to the output of the generator whose characteristics are shown in FIG. 8. In the absence of circuitry to maintain the output voltage at a constant level, the output voltage will drop following time $t_0$ to some particular value less than the desired value. The actual voltage to which the output will drop is determined by an iterative technique utilizing the curve shown in FIG. 8.

The first step in the iteration is to select a reasonable value to which it is expected the voltage at the output of the generator will drop. For example, assume that the voltage will drop to 80 volts, in which case the current through the load should equal 80/5 = 16 amps. With reference to the voltage/current curve of FIG. 8, at an output voltage of 80 volts the machine develops 29 amps of load current. This value of load current does not approximate the calculated value of 16 amps and hence a different value for the machine output voltage immediately following the application of the step load must be assumed.

Next, assume that the voltage at the output of the generator drops to 90 volts. The output current should, therefore, be 90 volts/5 ohms = 18 amps. An inspection of FIG. 8 indicates that at 90 volts output the current is approximately 14 amps. Again, the value for the output current obtained from the curve is substantially different from the calculated value. Accordingly, a still further estimate of the output voltage must be attempted.

Assume that the output voltage of the generator drops to 88 volts following application of the 5 ohm step load. The output current should therefore be 88 volts ÷ 5 ohms = 17.6 amps, which closely approximates the value obtained from the curve of FIG. 8. Hence, immediately after time $t_0$, and before the transistor Q1 is turned on, the voltage across the buses 40,48 drops to approximately 88 volts. Since 88 volts is less than 95% of the desired output voltage of 100 volts, the voltage regulator 56 instructs the transistor control 64 to turn on the transistor Q1 to in turn couple the supplementary DC power across the diode 42. This action in turn causes the output voltage of the machine to drop still more due to the additional load which includes the transformer 50, the second rectifier 52 and the transistor Q1.

At rated voltage of 100 volts, the output power of the machine is $(100)^2/5$ ohms = 2000 watts. Referring to the power curve of FIG. 8, at 2000 watts output power, the output voltage of the machine is approximately 84 volts. Hence, 16 volts must be supplied by the transformer 50 in order to develop 100 volts to be delivered to the filter 46. The turns ratio of the transformer 60 must therefore be 84/16 in order to obtain the required output voltage. The energization of the transistor Q1 results in a further drop of 4 volts beyond the initial voltage drop due to the load application with an increase in load current of approximately 6 amps (i.e. 23.5 amps at 84 volts output as obtained from the graph of FIG. 8 minus 17.6 amps previously calculated).

I claim:

1. In a power supply providing power to a load wherein the power supply includes an alternator and a first rectifier for converting the alternator output into a primary DC voltage, the improvement comprising:
   a second rectifier coupled to the alternator output for converting the alternator output into supplemental DC power;
   means for sensing the level of the primary DC voltage; and
   a controlled switch coupled between the second rectifier and the load and controlled by the sensing means wherein the switch is closed to couple the supplemental DC power to the load when the level of the primary DC voltage drops to a particular value.

2. The improvement of claim 1, further including a transformer having a primary winding connected to the alternator output and a secondary winding connected to the second rectifier.

3. The improvement of claim 1, wherein the primary DC power is present on first and second buses, and further including a diode connected between the first power bus and the controlled switch.

4. The improvement of claim 3, wherein the controlled switch includes a transistor connected between the output of the second rectifier and the diode.

5. The improvement of claim 1, further including a voltage regulator having means for deriving an error voltage representing the difference between the level of the primary DC voltage and a desired voltage and means for operating the controlled switch in accordance with the error voltage.

6. The improvement of claim 5, wherein the operating means includes means for comparing the error voltage with a reference voltage to derive switch control signals for the controlled switch.

7. The improvement of claim 5, wherein the operating means includes means for generating a pulse-width modulated wave from the error voltage and means for controlling the controlled switch in accordance with the pulse-width modulated wave when the level of the primary DC voltage is below a certain level.

8. A power supply system providing power to a load comprising:
a polyphase alternator;
a first polyphase rectifier bridge for converting the alternator output into a DC voltage on first and second power buses; and
means for improving the transient response of the power supply system including
a transformer having a set of primary windings connected to the polyphase alternator output and a set of secondary windings which develop alternating current power from the polyphase alternator output,
a second rectifier bridge connected to the set of secondary windings for converting the alternating current power into supplemental DC power,
a third power bus,
a diode connecting the first power bus to the third power bus,
a transistor connected between the output of the second rectifier bridge and the third power bus,
a voltage regulator connected to and sensing the voltage across the first and second power buses and
a transistor control connected to the voltage regulator and operated thereby to control the conduction of the transistor to combine the supplemental DC power with the DC voltage when the output of the first rectifer bridge drops to a particular value thereby to minimize the effect of load changes on the system.

9. A power supply system providing power to a load, comprising:
an alternator;
a first rectifier for converting the alternator output into a primary DC voltage; and
means for improving the transient response of the power supply system, including
a transformer having a primary winding coupled to the alternator output and a secondary winding which develops alternating current power,
a second rectifier connected to the transformer secondary winding for converting the alternating current power into supplemental DC voltage,
a controlled switch coupled between the second rectifier and the primary DC voltage and
a voltage regulator responsive to the primary DC voltage having means for operating the controlled switch to combine the supplemental DC voltage with the primary DC voltage when the primary DC voltage drops below a certain level.

10. The power supply system of claim 9, wherein the controlled switch includes a transistor and a transistor control for operating the transistor.

11. The power supply system of claim 9, wherein the voltage regulator further includes means for combining the primary DC voltage with a first reference voltage to derive an error voltage, means for comparing the error voltage with a second reference voltage and means for controlling the controlled switch in accordance with the comparison.

12. The power supply system of claim 11, wherein the controlling means includes a pulse-width modulated waveform generator for producing a pulse-width modulated wave, means for combining the pulse-width modulated wave with the output of the comparison means and means coupled to the combining means for operating the transistor in accordance with the combined outputs.

* * * * *